US00RE39806E

(19) United States
(12) Reissued Patent
Takabayashi et al.

(10) Patent Number: US RE39,806 E
(45) Date of Reissued Patent: Sep. 4, 2007

(54) SCINTILLATOR PANEL, RADIATION IMAGE SENSOR, AND METHODS OF MAKING THE SAME

(75) Inventors: Toshio Takabayashi, Hamamatu (JP); Takuya Homme, Hamamatu (JP); Hiroto Sato, Hamamatu (JP)

(73) Assignee: Hamamatsu Photonics K.K., Shizuoka (JP)

(21) Appl. No.: 10/689,578

(22) Filed: Oct. 21, 2003

Related U.S. Patent Documents

Reissue of:
(64) Patent No.: 6,469,307
Issued: Oct. 22, 2002
Appl. No.: 09/737,819
Filed: Dec. 18, 2000

U.S. Applications:
(63) Continuation-in-part of application No. PCT/JP99/03264, filed on Jun. 18, 1999.

(30) Foreign Application Priority Data

Jun. 18, 1998 (JP) ..... 10-171191

(51) Int. Cl.
*G01T 1/20* (2006.01)
*G03B 42/02* (2006.01)

(52) U.S. Cl. ..... 250/270.11; 250/458.1; 250/483.1; 385/128

(58) Field of Classification Search ..... 250/370.11, 250/458.1, 483.1; 385/128
See application file for complete search history.

(56) References Cited

U.S. PATENT DOCUMENTS

| | | | | |
|---|---|---|---|---|
| 4,687,683 | A | 8/1987 | Ishii et al. | |
| 4,922,105 | A | 5/1990 | Hosoi | |
| 5,132,539 | A | 7/1992 | Kwasnick et al. | |
| 5,148,029 | A | 9/1992 | Persyk et al. | |
| 5,153,438 | A | 10/1992 | Kingsley et al. | |
| 5,168,540 | A | 12/1992 | Winn et al. | |
| 5,179,284 | A | 1/1993 | Kingsley et al. | |
| 2002/0162965 | A1 | 11/2002 | Okada et al. | 250/370.11 |

FOREIGN PATENT DOCUMENTS

| | | | |
|---|---|---|---|
| EP | 0 528 676 | A1 | 2/1993 |
| JP | 63-215987 | A | 9/1988 |
| JP | 63-216000 | | 9/1988 |
| JP | 01-172792 | A | 7/1989 |
| JP | 04-174400 | A | 6/1992 |
| JP | 04-174400 | | 6/1992 |
| JP | 05-196742 | A | 8/1993 |
| JP | 05-242841 | A | 9/1993 |
| JP | 07-021560 | B2 | 3/1995 |
| JP | 7-218698 | | 8/1995 |
| JP | 8-271884 | | 10/1996 |
| WO | WO 99/38031 | | 7/1999 |

*Primary Examiner*—Albert Gagliardi
(74) *Attorney, Agent, or Firm*—Drinker Biddle & Reath LLP

(57) ABSTRACT

A scintillator panel (2) comprises a radiation-transparent substrate(10), aflat resin film (12) formed on the substrate (10), a reflecting film (14) formed on the flat resin film (12), a deliquescent scintillator (16) formed on the reflecting film (14), and a transparent organic film (18) covering the scintillator (16).

27 Claims, 5 Drawing Sheets

SCINTILLATOR PANEL, RADIATION IMAGE SENSOR, AND METHODS OF MAKING THE SAME

Matter enclosed in heavy brackets [ ] appears in the original patent but forms no part of this reissue specification; matter printed in italics indicates the additions made by reissue.

RELATED APPLICATIONS

This is a Continuation-In-Part application of International Patent Application serial No. PCT/JP99/03264 filed on Jun. 18, 1999 now pending.

BACKGROUND OF THE INVENTION

1. Field of the Invention

The present invention relates to a scintillator panel and a radiation image sensor which are used for medical X-ray photography and the like, and methods of making them.

2. Related Background Art

While X-ray sensitive films have been used in medical and industrial X-ray photography, radiation imaging systems using radiation detectors have been coming into wider use from the viewpoint of convenience and their storability of photographed results. In such a radiation imaging system, pixel data caused by two-dimensional radiation are acquired by a radiation detector as an electric signal, which is then processed by a processing unit, so as to be displayed onto a monitor.

Conventionally known as a typical radiation detector is one disclosed in WO 92/06476 or the like. In this radiation detector, a scintillator directly formed on a substrate and an imaging device are bonded together, such that the radiation incident from the substrate side is converted into visible light by the scintillator, so as to be detected.

On the other hand, Japanese Patent Application Laid-Open No. HEI 5-196742 and No. SHO 63-215987 disclose a radiation detector in which, in order to protect a scintillator formed on an imaging device or a fiber optical plate (FOP), i.e., an optical part constituted by a plurality of fibers bundled together, against vapor (moisture) in the air, a water-impermeable, moisture-resistant barrier is formed on the upper side of scintillator layer.

SUMMARY OF THE INVENTION

In the case where the scintillator is directly formed on the substrate as in the radiation detectors mentioned above, however, the state of substrate surface (such as unevenness, roughness, and streaks formed upon rolling) has greatly influenced characteristics of scintillator panels. Namely, optical mirror surfaces are hard to prepare in Al sheets, Be sheets, and the like which are used as substrates. Therefore, in the case where radiation is made incident from the substrate side and is converted by the scintillator into visible light, from which an image is subsequently acquired through lens coupling and the like, image quality, luminance, resolution, and the like have greatly been influenced by the state of substrate surface.

It is an object of the present invention to provide a scintillator panel, a radiation image sensor, and methods of making them, which would not be influenced by the state of substrate surface.

The scintillator panel of the present invention comprises a radiation-transparent substrate, a flat resin film formed on the substrate, a reflecting film formed on the flat resin film, and a scintillator formed on the reflecting film.

According to the scintillator panel of the present invention, since the scintillator is provided on the flat resin film formed on the substrate, characteristics of the scintillator panel can be kept from changing due to the state of substrate surface. Also, the scintillator plate can enhance its optical output since it has a reflecting film.

The scintillator panel of the present invention is characterized in that at least a part of the scintillator of scintillator panel is covered with a transparent organic film. Since the scintillator is covered with the organic film, the scintillator panel of the present invention can protect the scintillator against vapor (moisture).

The radiation image sensor of the present invention comprises a radiation-transparent substrate, a flat resin film formed on the substrate, a reflecting film formed on the flat resin film, a scintillator formed on the reflecting film, and an imaging device disposed so as to face the scintillator. According to the radiation image sensor of the present invention, since the scintillator is provided on the flat resin film formed on the substrate, characteristics of the scintillator panel comprising the radiation image sensor can be kept from changing due to the state of substrate surface. Also, the scintillator plate can enhance its optical output since the reflecting film is provided.

The radiation image sensor of the present invention is characterized in that at least a part of the scintillator of radiation image sensor is covered with a transparent organic film. According to the scintillator of the present invention, since the scintillator is covered with the organic film, the scintillator can be protected against vapor (moisture).

The method of making a scintillator panel in accordance with the present invention comprises steps of forming a flat resin film on a radiation-transparent substrate, forming a reflecting film on the flat resin film, and forming a scintillator on the reflecting film.

In the method of making a scintillator panel in accordance with the present invention, the flat resin film is formed on the substrate, and the scintillator is formed on the flat resin film, whereby a scintillator panel whose characteristics would not change due to the state of substrate surface can be made. Also, since the reflecting film is formed on the flat resin film, the optical output of scintillator plate can be enhanced.

The method of making a scintillator panel in accordance with the present invention may further comprise a step of covering at least a part of the scintillator with a transparent organic film. Since the scintillator is covered with the organic film, the present invention can make a scintillator panel which can protect the scintillator against vapor (moisture).

The method of making a radiation image sensor of the present invention comprises steps of forming a flat resin film on a radiation-transparent substrate, forming a reflecting film on the flat resin film, forming a scintillator on the reflecting film, and disposing an imaging device opposite the scintillator.

In the method of making a radiation image sensor in accordance with the present invention, the flat resin film is formed on the substrate, and the scintillator is formed on the flat resin film, whereby a radiation image sensor comprising a scintillator panel whose characteristics would not change due to the state of substrate surface can be made. Also, since the reflecting film is formed on the flat resin film, it is possible to make a radiation image sensor which can enhance the optical output of scintillator plate.

The method of making a radiation image sensor in accordance with the present invention may further comprises a step of covering the scintillator with a transparent organic film. Since at least a part of the scintillator is covered with the organic film, the present invention can make a radiation image sensor comprising a scintillator panel which can protect the scintillator against vapor (moisture).

The transparent organic film may cover the all surfaces (top and side surfaces) of the scintillator for securely protecting the scintillator against vapor. More preferably, the transparent organic film may reach to the surface of the substrate.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

Figure 1:
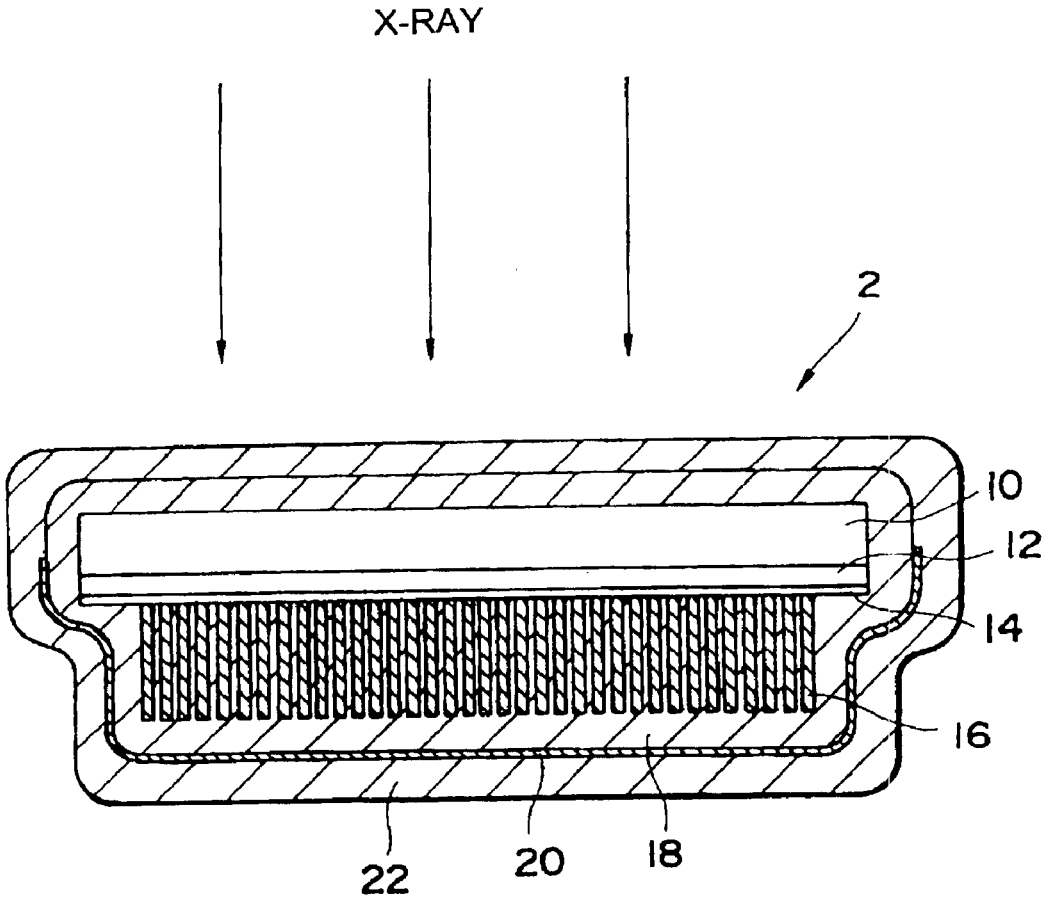
FIG. 1 is a sectional view of the scintillator panel in accordance with an embodiment of the present invention.
Figure 2:
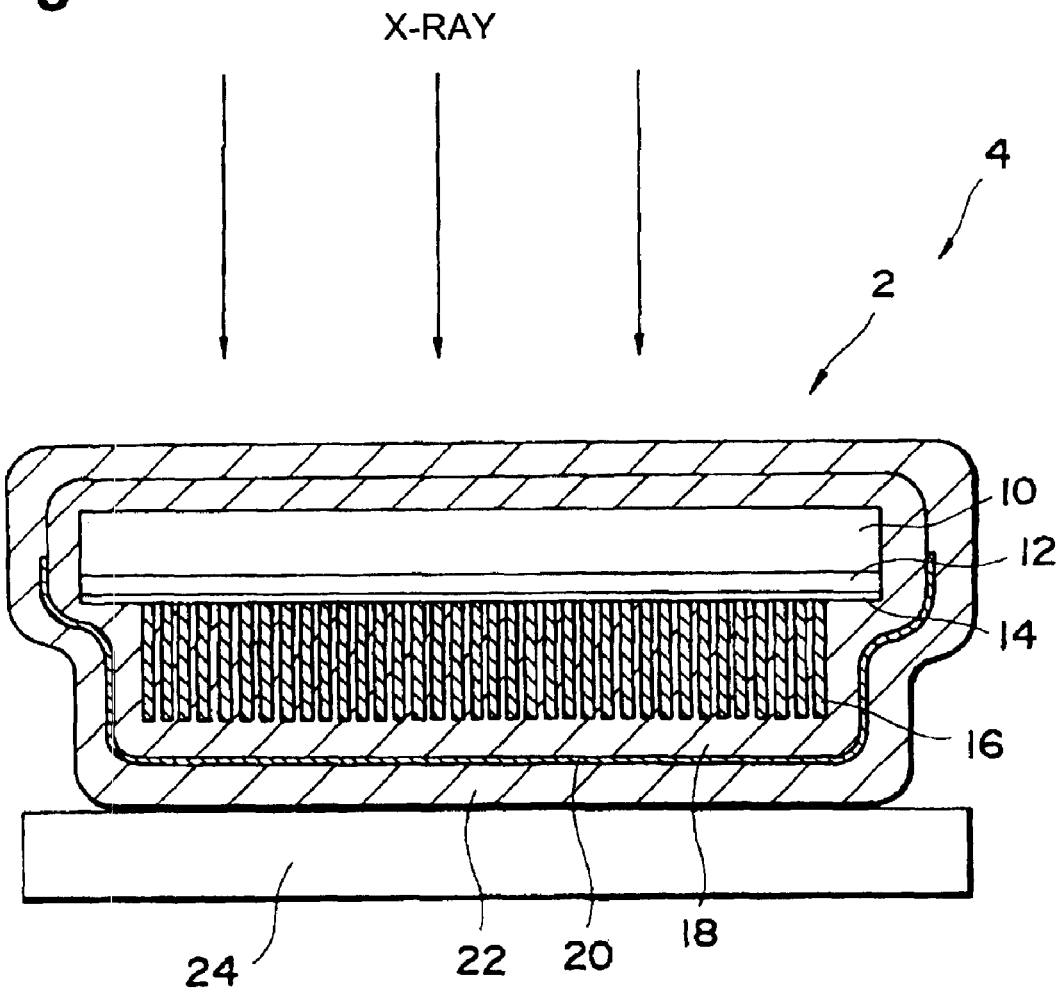
FIG. 2 is a sectional view of the radiation image sensor in accordance with an embodiment of the present invention.

In the following, embodiments of the present invention will be explained with reference to FIGS. 1 to 5C. FIG. 1 is a sectional view of a scintillator panel 2 in accordance with an embodiment, whereas FIG. 2 is a sectional view of a radiation image sensor 4 in accordance with an embodiment.

As shown in FIG. 1, one surface of a substrate 10 made of Al in the scintillator panel 2 is formed with a flat resin film 12 constituted by a polyimide resin, whereas a reflecting film 14 made of Al is formed on the surface of flat resin film 12. The surface of reflecting film 14 is formed with a scintillator 16, having a columnar structure, for converting incident radiation into visible light. Used in the scintillator 16 is CsI doped with Tl.

The scintillator 16 formed on the reflecting film 14, together with the substrate 10, is covered with a first polyparaxylylene film (first transparent organic film) 18, whereas the surface of first polyparaxylylene film 18 on the scintillator 16 side is formed with an $SiO_2$ film (transparent inorganic film) 20. Further, the surface of $SiO_2$ film 20 and the surface of the part of first polyparaxylylene film 18 not formed with the $SiO_2$ film 20 on the substrate 10 side are formed with a second polyparaxylylene film (second transparent organic film) 22, whereby all surfaces are covered with the second polyparaxylylene film 22. As shown in FIG. 2, the radiation image sensor 4 has a structure in which an imaging device 24 is bonded to the scintillator panel 2 on the scintillator 16 side.

With reference to FIGS. 3A to 4B, steps of making the scintillator panel 2 will now be explained. First, a polyimide resin is applied by a predetermined thickness (10 μm) to one surface of a rectangular substrate 10 (having a thickness of 0.5 mm) made of Al, so as to form a flat resin film 12 (see FIG. 3A). Namely, the flat resin film 12 for flattening the rolling streaks formed upon rolling the Al sheet is formed.

Figure 3A:
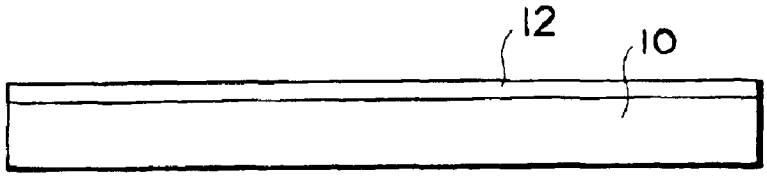
FIGS. 3A, 3B, 3C, 3D, 4A and 4B are views showing sequential steps of making the scintillator panel in accordance with an embodiment of the present invention.
Figure 3B:
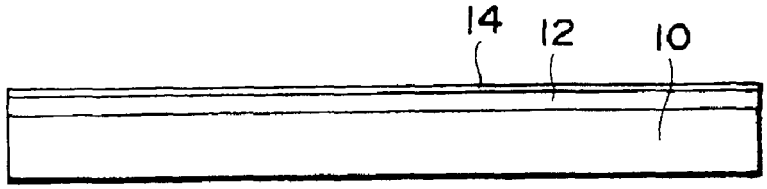
Figure 3C:
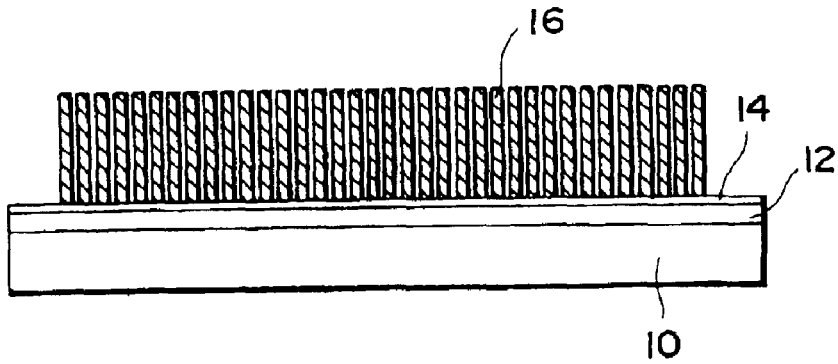
Figure 3D:
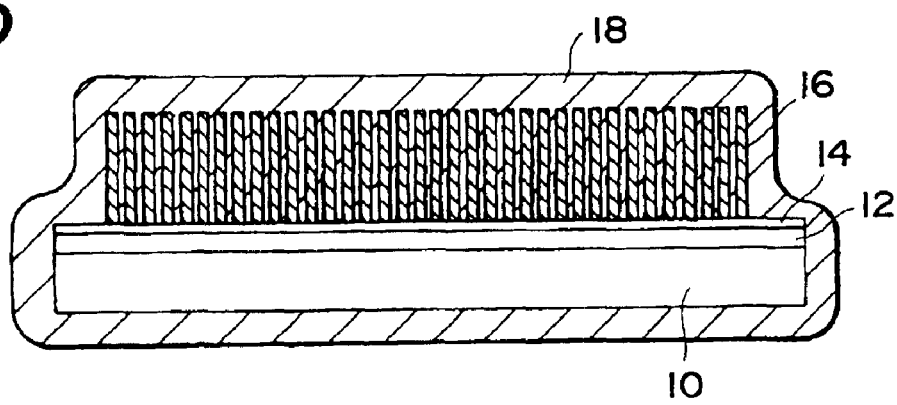

After the flat resin film 12 is cured, an Al film 14, which is a reflecting film, is formed with a thickness of 100 nm on the surface of flat resin film 12 by vacuum vapor deposition method (see FIG. 3B). Subsequently, columnar crystals of CsI doped with Tl are grown on the surface of Al film 14 by vapor deposition method, so as to form a scintillator 16 with a thickness of 200 μm (see FIG. 3C). Since CsI forming the scintillator 16 is high in moisture absorbency so that it will deliquesce by absorbing vapor in the air if left exposed, a first polyparaxylylene film 18 is formed by CVD method in order to prevent this from occurring. Namely, the substrate 10 formed with the scintillator 16 is put into a CVD apparatus, so as to form the first polyparaxylylene film 18 by a thickness of 10 μm. As a consequence, the first polyparaxylylene film 18 is formed on all surfaces of the scintillator 16 and substrate 10 (see FIG. 3D). Since the tip part of scintillator 16 is uneven, the first polyparaxylylene film 18 also acts to flatten the tip part of scintillator 16.

Figure 4A:
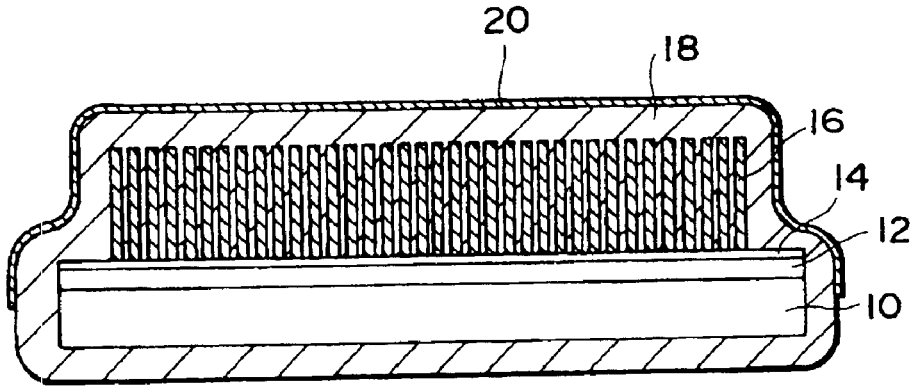

Next, an $Sio_2$ film 20 is formed with a thickness of 200 nm by sputtering on the surface of first polyparaxylylene film 18 on the scintillator 16 side (see FIG. 4A). The $SiO_2$ film 20 is formed in an area covering the scintillator 16 since it is aimed at improving the moisture resistance of scintillator 16. Since the tip part of scintillator 16 is flattened by the first polyparaxylylene film 18 as mentioned above, the $SiO_2$ film 20 can be made thinner (with a thickness of 100 nm to 300 nm) so that the output light quantity would not decrease.

Figure 4B:
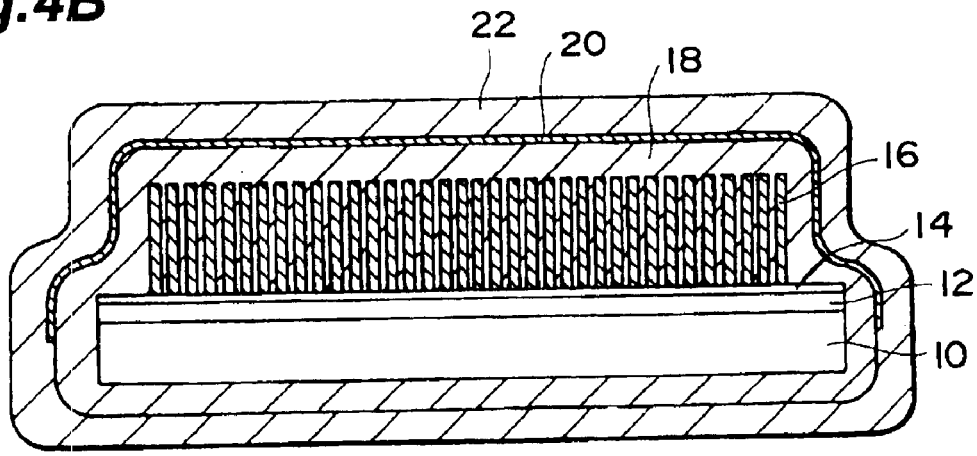

Further, a second polyparaxylylene film 22 for preventing the $SiO_2$ film 20 from peeling is formed with a thickness of 10 μm by CVD method on the surface of $SiO_2$ film 20 and the surface of first polyparaxylylene film 18 not formed with the $SiO_2$ film 20 on the substrate 10 side (see FIG. 4B). When this step is completed, the making of scintillator panel 2 ends.

The radiation image sensor 4 is made when an imaging device (CCD) 24 is bonded to thus completed scintillator panel 2 on the scintillator 16 side.

Figure 5A:
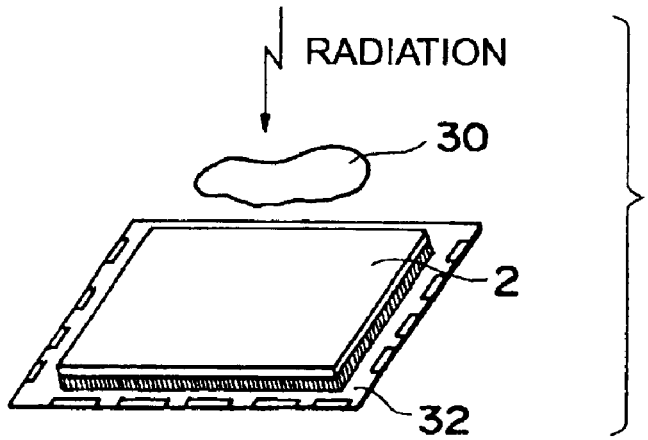
FIGS. 5A, 5B and 5C are views showing specific examples of use of the scintillator panel in accordance with an embodiment of the present invention.
Figure 5B:
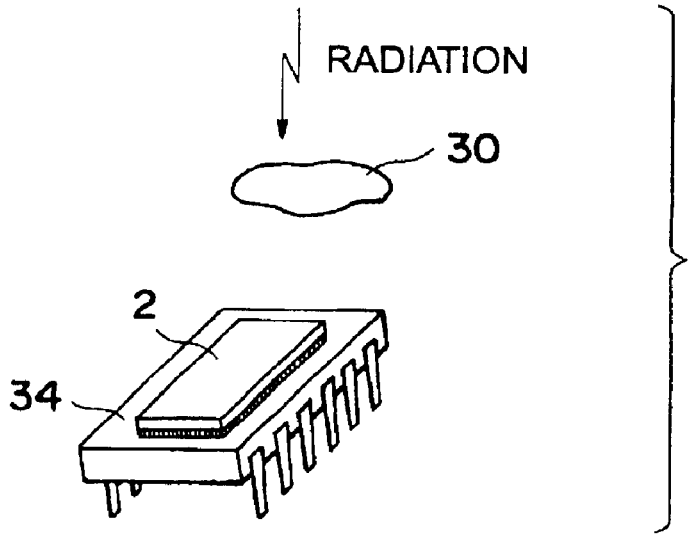
Figure 5C:
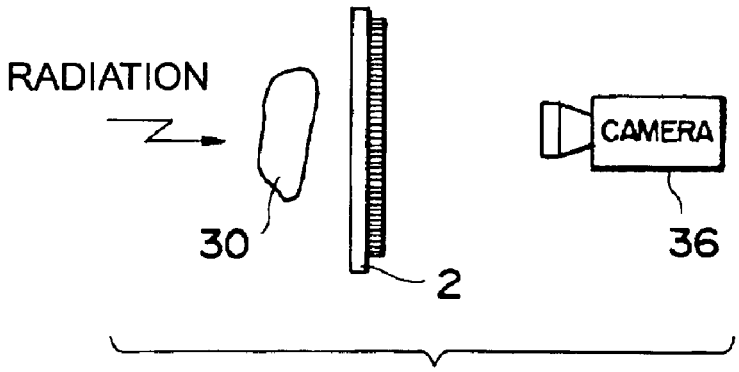

With reference to FIGS. 5A to 5C, specific examples of the use of the scintillator panel 2 will now be explained. FIG. 5A is a view showing the state where the scintillator panel 2 is coupled to a flat panel sensor (a-Si thin-film transistors with photodiodes). The radio-active rays transmitted through an object 30 are converted by the scintillator panel 2 into visible lights, which are then detected by the flat panel sensor. FIG. 5B is a view showing the state where the scintillator panel 2 is directly coupled to an imaging device (CCD) 34. The radio-active rays transmitted through the object 30 are converted by the scintillator panel 2 into visible lights, which is then detected by the imaging device 34. FIG. 5C is a view showing the state where the scintillator panel 2 is lens-coupled. The radio-active rays transmitted through the object 30 are converted by the scintillator panel 2 into visible lights, which are then detected by a CCD camera 36.

In the scintillator panel 2 in accordance with this embodiment, as explained in the foregoing, since the surface of substrate 10 is flattened by the flat resin film 12 made of a polyimide resin, the state of substrate surface would not influence characteristics of the scintillator panel 2. Also, since the reflecting film 14 is disposed on the surface of flat resin film 12, the optical output of the scintillator panel 2 can be enhanced.

In the radiation image sensor 4 in accordance with this embodiment, since the surface of substrate 10 is flattened by the flat resin film 12 made of a polyimide resin, the state of substrate surface would not influence characteristics of the scintillator panel 2 involved in the radiation image sensor 4. Also, since the reflecting film 14 is disposed on the surface of flat resin film 12, the optical output of the scintillator panel 2 involved in the radiation image sensor 4 can be enhanced.

Though a polyimide resin is used as the flat resin film 12 in the above-mentioned embodiment, it is not restrictive, whereby epoxy resin, Si resin, and the like may also be used. Also, though the thickness of flat resin film 12 is set to 10 μm in the above-mentioned embodiment, any thickness can freely be chosen without being restricted to 10 μm if appropriate as long as it is such a thickness as to eliminate the unevenness in the surface of substrate 10.

Though an Al film is used as the reflecting film 14 in the above-mentioned embodiment, it is not restrictive; and Ag films, Au films, Pt films, and the like may also be used.

Though the $SiO_2$ film is used as the transparent inorganic film 20, it is not restrictive; and inorganic films made from $Al_2O_3$, $TiO_2$, $In_2O_3$, $SnO_2$, MgO, $MgF_2$, LiF, $CaF_2$, AgCl, SiNO, SiN and the like may also be used.

Though CsI(Tl) is used as the scintillator 16 in the above-mentioned embodiment, it is not restrictive; and CsI(Na), NaI(Tl), LiI(Eu), KI(Tl), and the like may also be used.

Though a substrate made of Al is used as the substrate 10 in the above-mentioned embodiment, any substrate can be used as long as it has a favorable X-ray transmissivity, whereby substrates such as those made of C (graphite) mainly composed of carbon, those made of amorphous carbon, those made of Be, those made of SiC, and the like may also be used. Substrates made of glass may be used as well.

Though the $SiO_2$ film 20 is formed on the surface of first polyparaxylylene film 18 on the scintillator 16 side in the above-mentioned embodiment, the $SiO_2$ film 20 may be formed on not only the surface of first polyparaxylylene film 18 on the scintillator 16 side, but also on all surfaces of the first polyparaxylylene film 18.

Though the second polyparaxylylene film 22 is formed on the surface of $SiO_2$ film 20 and the surface of first polyparaxylylene film 18 on the substrate 10 side, i.e., on all surfaces in the above-mentioned embodiment, the second polyparaxylylene film 22 acts to prevent the $SiO_2$ film 20 from peeling, whereby the material thereof is not restricted as long as the film is made of a transparent material, and it may also be formed in an area covering the $SiO_2$ film 20.

As the polyparaxylylene film in the above-mentioned embodiment, not only polyparaxylylene but also polymonochloroparaxylylene, polydichloroparaxylylene, polytetrachloroparaxylylene, polyfluoroparaxylylene, polydimethylparaxylylene, polydiethylparaxylylene, and the like can be used.

According to the scintillator panel of the present invention, since the scintillator is provided on the flat resin film formed on the substrate, characteristics of the scintillator panel can be kept from changing due to the state of substrate surface. Also, the scintillator plate can enhance its optical output since it has a reflecting film. In the case where the scintillator is covered with an organic film, the scintillator can be protected against vapor (moisture).

According to the radiation image sensor of the present invention, since the scintillator is provided on the flat resin film formed on the substrate, characteristics of the scintillator panel constituting the radiation image sensor can be kept from changing due to the state of substrate surface. Also, the scintillator plate involved in the radiation image sensor can enhance its optical output since the reflecting film is provided. When the scintillator is covered with an organic film, the scintillator constituting the radiation image sensor can be protected against vapor (moisture).

In the method of making a scintillator panel in accordance with the present invention, the flat resin film is formed on the substrate, and the scintillator is formed on the flat resin film, whereby a scintillator panel whose characteristics would not change due to the state of substrate surface can be made. Also, since the reflecting film is formed on the flat resin film, the optical output of scintillator plate can be enhanced. When the scintillator is covered with an organic film, it is possible to make a scintillator panel which can protect the scintillator against vapor (moisture).

In the method of making a radiation image sensor in accordance with the present invention, the flat resin film is formed on the substrate, and the scintillator is formed on the flat resin film, whereby a radiation image sensor comprising a scintillator panel whose characteristics would not change due to the state of substrate surface can be made. Also, since the reflecting film is formed on the flat resin film, it is possible to make a radiation image sensor which can enhance the optical output of scintillator plate. When the scintillator is covered with an organic film, it is possible to make a radiation image sensor comprising a scintillator panel which can protect the scintillator against vapor (moisture).

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A scintillator panel comprising a radiation-transparent substrate, a flat resin film formed on said substrate, a reflecting film formed on said flat resin film, and a scintillator formed on said reflecting film.

2. A scintillator panel according to claim 1, wherein at least a part of said scintillator is covered with a transparent organic film.

3. A scintillator panel according to claim 2, wherein said transparent organic film covers over the all surfaces of said scintillator.

4. A scintillator panel according to claim 1, wherein said flat resin film is directly formed on said substrate.

5. A scintillator panel according to claim 1, wherein said scintillator is directly formed on said [flat resin] *reflecting* film.

6. A radiation image sensor comprising a radiation-transparent substrate, a flat resin film formed on said substrate, a reflecting film formed on said flat resin film, a scintillator formed on said reflecting film, and an imaging device disposed so as to face said scintillator.

7. A radiation image sensor according to claim 6, wherein at least a part of said scintillator is covered with a transparent organic film.

8. A radiation image sensor according to claim 7, wherein said transparent organic film covers over the all surfaces of said scintillator.

9. A radiation image sensor according to claim 6, wherein said flat resin film is directly formed on said substrate.

10. A radiation image sensor according to claim 6, wherein said scintillator is directly formed on said [flat resin] *reflecting* film.

11. A method of making a scintillator panel comprising steps of:

forming a flat resin film on a radiation-transparent substrate;

forming a reflecting film on said flat resin film; and forming a scintillator on said reflecting film.

12. A method of making a scintillator panel according to claim 11, further comprising a step of covering at least a part of said scintillator with a transparent organic film.

13. A method of making a scintillator panel according to claim 12, wherein said transparent organic film covers the all surfaces of said scintillator.

14. A method of making a scintillator panel according to claim 11, wherein said flat resin film is directly formed on said radiation-transparent substrate.

15. A method of making a scintillator panel according to claim 11, wherein said scintillator is directly formed on said [flat resin] *reflecting* film.

16. A method of making a radiation image sensor comprising steps of:

forming a flat resin film on a radiation-transparent substrate;

forming a reflecting film on said flat resin film;

forming a scintillator on said reflecting film; and disposing an imaging device opposite said scintillator.

17. A method of making a radiation image sensor according to claim 16, further comprising a step of covering at least a part of said scintillator with a transparent organic film.

18. A method of making a radiation image sensor according to claim 17, wherein said transparent organic film is covering the all surfaces of said scintillator.

19. A method of making a radiation image sensor according to claim 16, wherein said flat resin film is directly formed on said radiation-transparent substrate.

20. A method of making a radiation image sensor according to claim 16, wherein said scintillator is directly formed on said [flat resin] *reflecting* film.

21. A scintillator panel comprising a radiation-transparent substrate, a flat resin film formed on said substrate, a reflecting film formed on said flat resin film, and a scintillator formed on said reflecting film, wherein at least a part of said scintillator is covered with a transparent organic film, wherein said transparent organic film covers over all the surfaces of said scintillator, and wherein said transparent organic film reaches to the surfaces of said substrate.

22. A radiation image sensor comprising a radiation-transparent substrate, a flat resin film formed on said substrate, a reflecting film formed on said flat resin film, a scintillator formed on said reflecting film, and an imaging device disposed so as to face said scintillator, wherein at least a part of said scintillator is covered with a transparent organic film, wherein said transparent organic film covers over all the surfaces of said scintillator, and wherein said transparent organic film reaches to the surfaces of said substrate.

23. A method of making a scintillator panel comprising the steps of:

forming a flat resin film on a radiation-transparent substrate;

forming a reflecting film on said flat resin film;

forming a scintillator on said reflecting film; and covering at least a part of said scintillator with a transparent organic film, such that said transparent organic film covers all the surfaces of said scintillator and reaches to the surfaces of said substrate.

24. A method of making a radiation image sensor comprising the steps of:

forming a flat resin film on a radiation-transparent substrate;

forming a reflecting film on said flat resin film;

forming a scintillator on said reflecting film;

disposing an imaging device opposite said scintillator; and covering at least a part of said scintillator with a transparent organic film, such that said transparent organic film is covering all the surfaces of said scintillator and reaches to the surfaces of said substrate.

*25. A scintillator panel comprising:*

*a radiation-transparent substrate;*

*a scintillator layer supported by said substrate;*

*a flat resin film; and*

*a reflecting film supported by said flat resin film, said flat resin film and said reflecting film being provided between said radiation-transparent substrate and said scintillator layer.*

*26. A scintillator panel according to claim 25, wherein said flat resin film is directly formed on said substrate.*

*27. A scintillator panel according to claim 25, wherein said scintillator is directly formed on said reflecting film.*

* * * * *